(12) United States Patent
Kohler

(10) Patent No.: US 9,347,839 B2
(45) Date of Patent: May 24, 2016

(54) MEASURING ELEMENT, MEASURING BODY AND MEASURING ARRANGEMENT FOR MEASURING A FORCE, AND USE OF SUCH A MEASURING BODY

(71) Applicant: KISTLER HOLDING AG, Winterthur (CH)

(72) Inventor: Denis Kohler, Neftenbach (CH)

(73) Assignee: KISTLER HOLDING AG, Winterthur (CH)

( * ) Notice: Subject to any disclaimer, the term of this patent is extended or adjusted under 35 U.S.C. 154(b) by 52 days.

(21) Appl. No.: 14/404,663

(22) PCT Filed: Jun. 20, 2013

(86) PCT No.: PCT/CH2013/000108
§ 371 (c)(1),
(2) Date: Dec. 1, 2014

(87) PCT Pub. No.: WO2013/188989
PCT Pub. Date: Dec. 27, 2013

(65) Prior Publication Data
US 2015/0185094 A1    Jul. 2, 2015

(30) Foreign Application Priority Data
Jun. 20, 2012 (CH) ..................... 0865/12

(51) Int. Cl.
*G01L 1/00* (2006.01)
*G01L 1/16* (2006.01)
*G01L 5/16* (2006.01)

(52) U.S. Cl.
CPC .. *G01L 1/16* (2013.01); *G01L 5/167* (2013.01)

(58) Field of Classification Search
None
See application file for complete search history.

(56) References Cited

U.S. PATENT DOCUMENTS 3,614,488 A   10/1971   Sonderegger et al.
4,667,127 A *  5/1987   Krempl ............... H01L 41/1132
                                                    310/329

(Continued)

FOREIGN PATENT DOCUMENTS

CH    388 659    2/1965
CH    500 602    12/1970

(Continued)

OTHER PUBLICATIONS

International Search Report, issued Sep. 24, 2013.
International Preliminary Report on Patentability for PCT/CH2013/000108, issued Dec. 23, 2014.

*Primary Examiner* — Peter MacChiarolo
*Assistant Examiner* — Jermaine Jenkins
(74) *Attorney, Agent, or Firm* — Dority & Manning, P.A.

(57) ABSTRACT

A measuring element formed of a piezoelectric crystal of symmetry class 32 for measuring a force Fz, which acts perpendicularly on the plane x-y and causes a charge accumulation on surfaces of the plane x-y. Applications are measurements in which the transverse forces Fxy orthogonal to the force Fz, which generate an error signal at the measuring element, are expected on the measuring body. The measuring element includes at least four identical measuring element segments having straight edges. In the x-y plane the segments are arranged side by side and spaced apart by narrow gaps at the edges. Together, the segments form the shape of a disc or perforated disc for reducing the interference signals caused by the transverse forces Fxy on the measuring element. The crystal orientations in the x-y plane of all segments are oriented in the same direction or orthogonal to each other.

16 Claims, 4 Drawing Sheets

(56) References Cited

U.S. PATENT DOCUMENTS

| | | | | |
|---|---|---|---|---|
| 4,903,166 | A * | 2/1990 | Galvagni | H01G 4/30 29/25.42 |
| 6,269,697 | B1 * | 8/2001 | Okada | G01C 19/56 73/504.02 |
| 6,715,363 | B1 * | 4/2004 | Deng | B06B 1/161 73/782 |
| 6,940,213 | B1 * | 9/2005 | Heinz | F02M 51/0603 310/328 |
| 7,548,012 | B2 * | 6/2009 | Cavalloni | G01L 1/16 310/338 |
| 7,936,110 | B2 * | 5/2011 | Andle | H03H 9/177 310/333 |
| 8,042,413 | B2 * | 10/2011 | Schaffner | B23K 20/10 73/862.68 |
| 8,082,790 | B2 * | 12/2011 | Dube | G01P 15/0915 73/504.15 |
| 8,495,917 | B2 * | 7/2013 | Radivojevic | G01L 1/16 73/777 |
| 8,869,615 | B2 * | 10/2014 | Janiaud | G01C 19/5607 73/504.12 |
| 2010/0151553 | A1 * | 6/2010 | Bjork | G01N 29/022 435/173.7 |

FOREIGN PATENT DOCUMENTS

| | | |
|---|---|---|
| DE | 19 29 478 | 2/1970 |
| DE | 34 40 670 | 5/1986 |
| DE | 42 17 766 | 7/1993 |
| EP | 0 012 867 | 7/1980 |
| EP | 0 270 693 | 6/1988 |
| EP | 0 316 498 | 5/1989 |
| WO | WO 2007/024225 | 3/2007 |
| WO | WO 2007/143870 | 12/2007 |

* cited by examiner

MEASURING ELEMENT, MEASURING BODY AND MEASURING ARRANGEMENT FOR MEASURING A FORCE, AND USE OF SUCH A MEASURING BODY

CROSS-REFERENCE TO RELATED APPLICATIONS

This application claims priority to International Application Serial No. PCT/CH2013/000108, filed Jun. 20, 2013, which claims priority to Swiss Application No. 00865/12 filed Jun. 20, 2012. International Application Serial No. PCT/CH2013/000108 is hereby incorporated herein in its entirety for all purposes by this reference.

FIELD OF THE INVENTION

The invention pertains to a piezoelectric measuring element made of a crystal of symmetry class 32, particularly of quartz, which is realized flat in a plane x-y and intended for installation into a measuring body for measuring a force $F_z$ that acts perpendicularly upon the plane x-y. Such a force $F_z$ causes a charge accumulation on the surfaces of the measuring element that receive the force and are provided with electrodes. In this respect, the invention only pertains to measuring elements, in which transverse forces $F_{xy}$ that act orthogonal to the force $F_z$ and generate an error signal at the measuring element are expected upon the measuring body during a measurement.

BACKGROUND

Pressure sensors or force sensors are used in numerous applications. Such sensors frequently are simultaneously subjected to different forces, namely forces from all three Cartesian directions x, y, z, shearing forces and moments. Exemplary applications are measurements of cutting forces in manufacturing processes, particularly milling operations, planing operations and the like, in which a translatory motion in the x-y direction is carried out by exerting a force. Depending on the respective application, several of these forces should be measured. In this context, forces in the z-direction, the x-direction and the y-direction, as well as the moment $M_z$ in the z-direction, are usually of particular interest, wherein the surface of the workpiece to be processed extends in the x-y direction and its surface normal extends in the z-direction.

In such measurements, the individual force components need to be measured independently of the other forces or moments in any case. For this purpose, a sensor comprises a measuring body with several individual measuring elements that respectively measure one component. The measuring elements are usually realized in disks or perforated disks and consist of piezoelectric material. A certain number of positive and negative unit charges are emitted on opposite surfaces of the measuring elements proportionally to a force acting in a certain direction. Electrodes on the respective surfaces of the measuring elements collect these charges that ultimately are conveyed to charge converters or amplifiers in specially insulated lines. The measuring elements need to be installed in the sensor or in the measuring body under prestress such that negative forces can also be measured and contact with the electrodes is always ensured.

Different types of piezoelectric or piezoresistive plates can be used for measuring several force components or moments simultaneously. In a multicomponent sensor, for example, it is known to stack different plates on top of one another, wherein each plate can only measure one force component or one moment component and is relatively insensitive to all other effects of forces and moments. These plates are usually shaped in the form of disks or perforated disk. The advantage of plates in the shape of perforated disks can be seen in that a central mounting bolt can be used.

Particularly in piezoelectric measuring elements that are made of a crystal of symmetry group 32 and intended for measuring forces $F_z$ acting perpendicularly upon the plate surfaces, however, it was determined that crosstalk occurs if transverse forces $F_{xy}$ composed of the components $F_x$ and $F_y$ are applied orthogonally to $F_z$. When such a transverse force $F_{xy}$ occurs, these $F_z$-measuring elements generate interference signals in that charges are emitted in certain quantities on the surfaces that are in electric contact with the electrodes.

A thusly created interference signal distorts the resulting measuring signal because it is superimposed on the signal generated due to the force $F_z$ only. The interference signal can easily amount to 5 to 10% of the nominal value of the component $F_{xy}$ that should not be measured by the measuring element. In this way, a systematic measuring error is created. During the measurement of $F_z$, the interference signal created due to crosstalk can be enormous in comparison with the signal that was caused by $F_z$ and the amount of which should be measured by means of the measuring element, particularly if the amount of the transverse force $F_{xy}$ is several times greater than the normal force $F_z$ as it is the case, e.g., in milling or planing operations.

The interference signals generated in the direction $F_z$ by the transverse force $F_{xy}$ only occur in the aforementioned measuring elements that are cut from a piezoelectric crystal of symmetry group 32. The crystal plates are ultimately created by means of cuts of the crystal that were produced perpendicular to the crystallographic X-axis. This results in crystal plates with longitudinal effect that are particularly well suited for measuring forces, which is why they are preferably used in the aforementioned applications. In such measuring elements, however, the aforementioned crosstalk and the associated generation of interference signals occur in the aforementioned applications.

Other measuring elements with different crystallographic orientation behave differently when transverse forces $F_{xy}$ act upon the measuring element orthogonally to the force $F_z$ and therefore are not the object of the present invention.

These other measuring elements include, for example, different piezoelectric materials and materials from a different point group and measuring elements made of materials other than crystals such as, for example, of piezoresistive materials or piezoceramics. These other measuring elements also include all types of measuring elements that are designed for applications other than measuring a force acting perpendicular to the plate orientation such as, for example, for measuring an acceleration or a moment or a shearing force. These types of other measuring elements respectively are not the object of the present invention.

BRIEF SUMMARY OF THE INVENTION

It is the objective of the present invention to disclose a measuring element of the initially described type, in which crosstalk caused by transverse forces $F_{xy}$ acting upon the measuring element is reduced without noticeable loss of load carrying capacity. The invention accordingly discloses a measuring body, a measuring arrangement and a use of such a measuring body, in which crosstalk respectively is significantly reduced. The invention also aims to disclose a method for cost-efficiently manufacturing such a measuring element with little effort.

These objectives are attained as described below.

The invention is based on the notion that the inventive measuring element includes at least four, preferably eight, identical measuring element segments with straight. The segments are in the x-y plane adjacently arranged close to one another and spaced apart by narrow gaps at the flanks. The segments jointly form the shape of a disk or perforated disk. According to the invention, the crystal orientations, which respectively extend, for example, parallel to the crystallographic Y-axis of the crystal, should additionally be aligned in the same direction or orthogonally to one another in the x-y plane of all segments.

In this context, the term "identical" means that the measuring element segments have the same constitution, i.e. they are formed of the same material and, in particular, have the same shapes, dimensions and sensitivities to a force acting perpendicular to the x-y plane. The interference signals on the measuring element caused by transverse forces Fxy are reduced with the inventive arrangement.

BRIEF DESCRIPTION OF THE DRAWINGS

The invention is described in greater detail below with reference to the drawings. In these drawings.

DESCRIPTION OF EXEMPLARY EMBODIMENTS OF THE INVENTION

The invention is described in greater detail below with reference to the figures. Identical components/circumstances are respectively identified by the same reference symbols.

Figure 1:
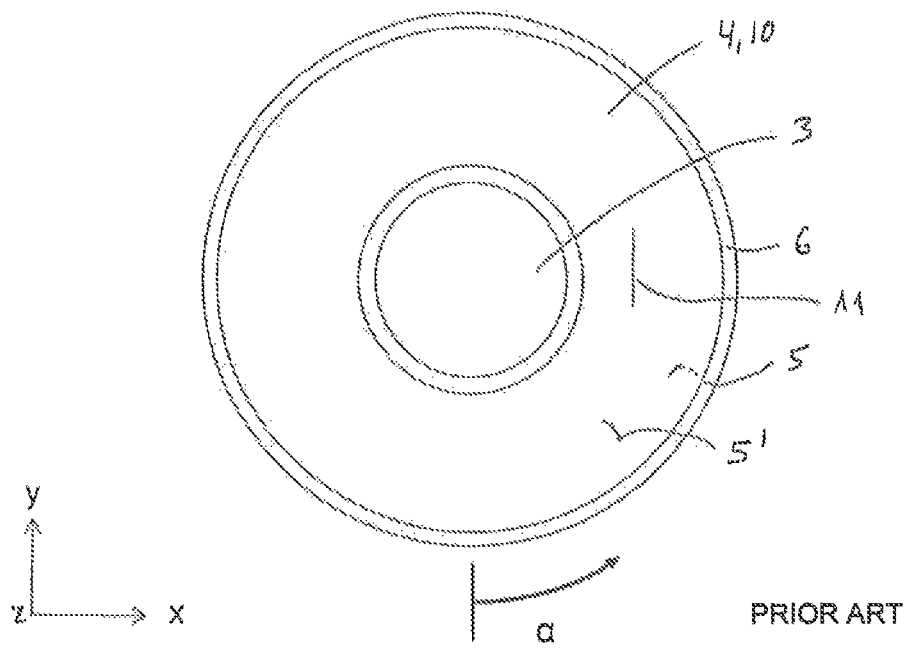
FIG. 1 shows a schematic top view of a measuring element according to the prior art.

FIG. 1 shows a one-piece measuring element 4 according to the prior art such as, for example, a piezoelectric measuring element 4 in the form of a disk 10 that is realized in the form of a perforated disk 10 with a central opening 3 in this case. The measuring element 4 is situated on an electrode 6 with its entire lower surface 5 that is not visible in the figure. A not-shown second electrode 6' is situated on the upper surface 5' of the measuring element disk 4. The disk 10 extends in the directions x, y and the normal thereto is referred to as z. The crystal orientation 11 of the measuring element 4 is aligned in any direction within the surface x-y. This crystal orientation 11 refers to the cut of the crystal and designates, for example, the orientation Y or Z of the crystal structure. In FIG. 1, it is aligned in the y-direction and illustrated in the form of a bar. The measuring element 4 is realized in such a way that a force Fz acting upon the disk 10 in the z-direction generates a corresponding measuring signal that can be picked up by the two electrodes 6, 6' on corresponding not-shown lines.

Figure 7:
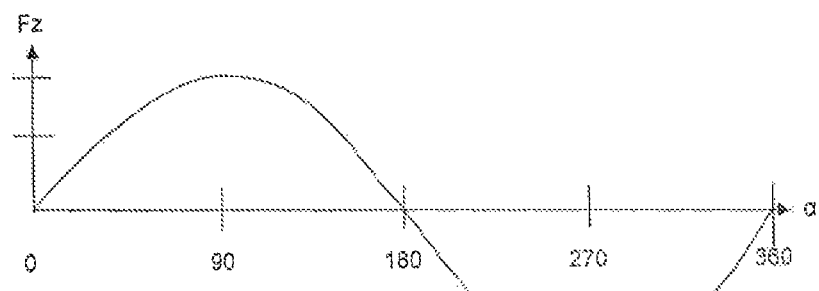
FIG. 7 shows the measured amplitude Fz of an interference signal caused by a transverse force Fxy in dependence on the concurrence of the direction of action α of Fxy with the crystal orientation
  a) in a solid quartz disk according to FIG. 1;
  b) in a measuring element with 4 segments according to FIG. 2;
  c) in a measuring element with 8 segments according to FIG. 3 and with alternating crystal orientations.
Figure 7:
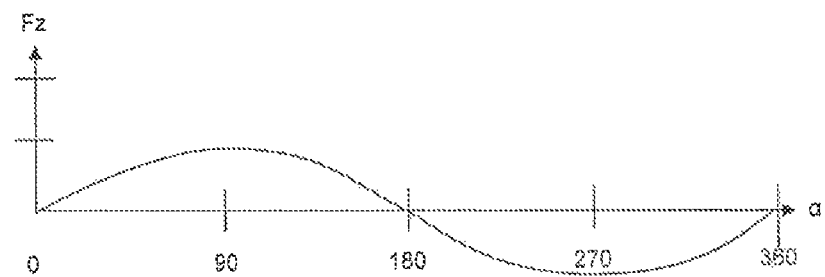
Figure 7:
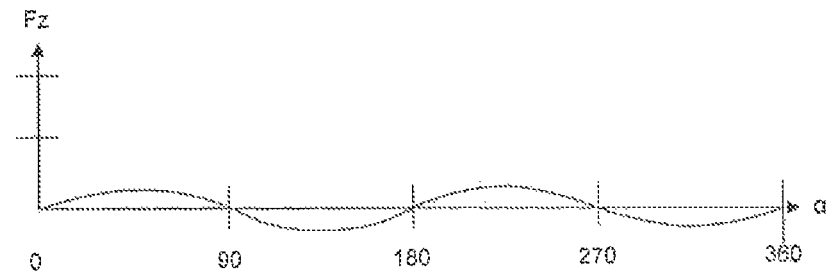

It was determined that a transverse force Fxy extending perpendicular to the force Fz inadvertently generates a certain amount of charge quanta that accumulate on the electrodes 6, 6 and lead to an error signal. This error signal changes its amplitude in relation to the concurrence of the orientation of the crystal structure 11 and the direction α in the x-y plane, from which the transverse force Fxy is applied, in sine form. FIG. 7a shows the amplitude of the interference signal Fxy in dependence on the concurrence of the angle of application and the crystal orientation 11. For example, the error signal is maximal if the crystal structure 11 extends in the y-direction and the transverse force Fxy extends in the x-direction. Accordingly, the error signal is zero if the crystal orientation 11 and the transverse force Fxy extend parallel to one another.

Figure 2:
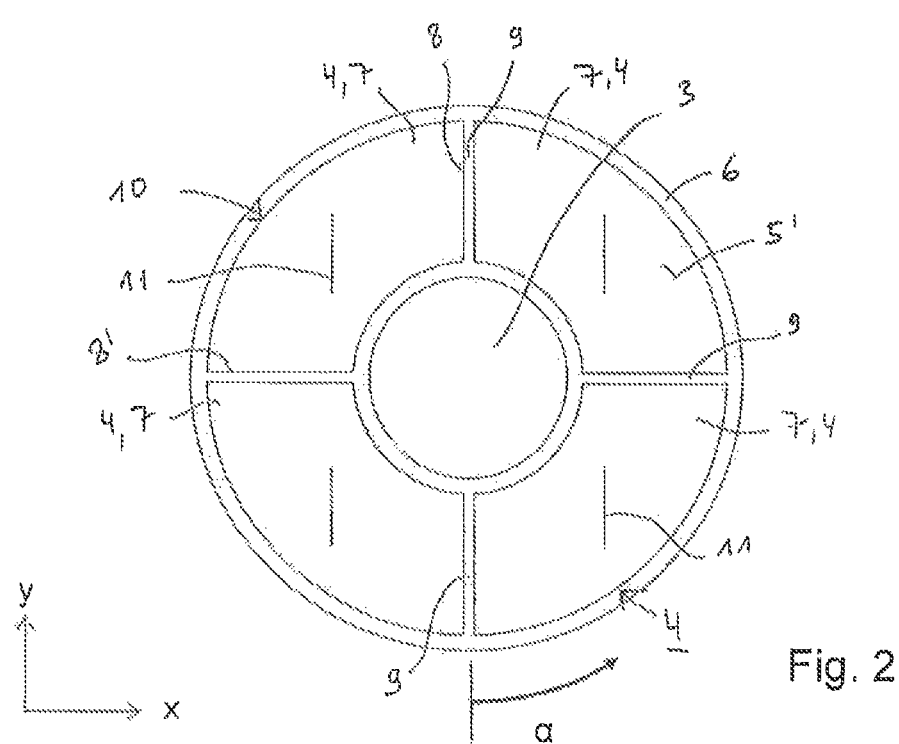
FIG. 2 shows a schematic top view of an inventive measuring element with four segments.

FIG. 2 shows an inventive embodiment of the measuring element 4 that is likewise situated on an electrode 6 underneath a not-shown electrode 6' that lies on the visible surface 5' of the measuring element 4. Analogous to the measuring element in FIG. 1, this measuring element 4 is also a piezoelectric measuring element that is made of a crystal of symmetry class 32, particularly of quartz. It is realized flat in a plane x-y and intended for installation into a measuring body for measuring a force Fz that acts perpendicularly upon the plane x-y.

In contrast to the measuring element shown in FIG. 1, this measuring element 4 is divided into four identical measuring element segments 7. These segments may be produced, for example, by sawing a perforated disk according to FIG. 1 through the center twice by means of orthogonal cuts. The respective orientations of the crystal structure 11 of the disk 10 or its segments 7 are illustrated in the form of bars and all aligned in the same direction in this case. Likewise, they all extend parallel to one another in the y-direction.

The measuring element segments 7 lie in the x-y plane and have straight flanks 8, 8', at which they are arranged close to their adjacent segments 7 and spaced apart therefrom by narrow gaps 9. For example, the gap widths 9 may correspond to the width of the saw blades used for sawing up the disk 10. In their arrangement between the electrodes 6, 6, the segments 7 in conjunction with the gaps 9 form the shape of a disk or perforated disk 10 with or without central opening 3.

In practical applications, a force Fz respectively acts perpendicularly upon the measuring element 4 or upon the electrodes 6', 6 of the segments 7. The piezoelectric measuring element 4 generates positive and negative charge quanta on the surfaces 5, 5 and forwards them to the electrodes 6, 6' that are in electric contact with the surfaces 5, 5' and accumulate the charges. These electrodes ultimately forward the charges to not-shown lines that are in electric contact with the electrodes for evaluation purposes.

It was determined that the amplitude of the maximum interference signal is approximately cut in half if the measuring element 4 is divided into four segments 7 as illustrated in FIG. 2 instead of realized in one piece as illustrated in FIG. 1. FIG. 7b shows the amplitude of a corresponding interference signal caused by an interference force Fxy in a measuring element with four segments 7 according to FIG. 2.

With respect to the segmenting, it should naturally be ensured that the overall surface of the measuring element disk 10 is not excessively reduced such that the load bearing capacity of the measuring element is not significantly reduced. The gaps 9 between the segments 7 should usually amount to no more than 20%, preferably no more than 10%, of the overall surface of the disk or perforated disk 10. In their arrangement in the form of a theoretical disk 10, however, the segments 7 cannot contact one another because errors would otherwise occur once again. Accordingly, the segments 7 cover at least 80%, preferably at least 90%, of the overall perforated disk surface 10.

Figure 3:
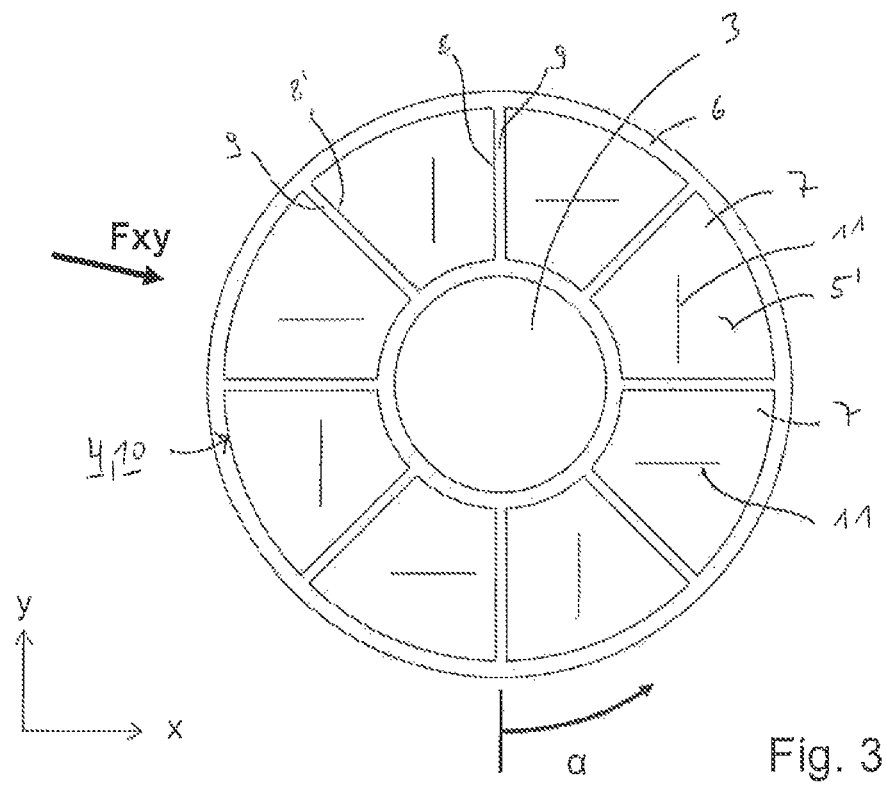
FIG. 3 shows a schematic top view of an inventive measuring element with eight segments.

FIG. 3 shows an inventive measuring element according to FIG. 2 that, however, is divided into eight segments 7. The crystal orientations 11 of all segments 7 in FIG. 2 are aligned in the same direction in the x-y plane, namely parallel to one another in the y-direction, whereas the crystal orientations 11 of adjacent segments 7 in FIG. 3 are, according to the invention, aligned orthogonally to one another in alternating directions of the x-y plane.

A transverse force Fxy then causes an error signal on a segment 7 that is partially canceled out by another segment 7. The segments 7 for the arrangement shown in FIG. 3 may likewise be produced by sawing up a solid one-piece disk 10, wherein every second segment 7, for example, is subsequently removed, turned by 90° and once again deposited in the position after the next position referred to the rotating direction.

The electrodes 6, 6' may be realized continuously in the form of disks or perforated disks as illustrated in the figures. In this case, they at least cover the surface of the disk or perforated disk 10 continuously to both sides of the segments 7.

FIG. 7(c) shows the amplitude of an interference signal that is caused by an interference force Fxy in a measuring element with eight segments 7 according to FIG. 3 in dependence on the direction of application of the interference force Fxy, wherein the segments 7 have different crystal orientations. In this case, the amplitude of the interference signal amounts to approximately one-eighth of the original interference signal in FIG. 1.

However, it should always be ensured that all segments 7 of a measuring element 4 are identical. In this context, identical means that they are made of the same material and have the same sensitivities to a force acting in the Z-direction. Their shapes and dimensions are also identical. They can only differ with respect to the crystal orientation 11 in relation to the arrangement in the measuring element 4, namely in accordance with the original position of the individual segments prior to sawing up the disk. The crystal orientation 11 may be aligned, for example, parallel or transverse to a flank 8 or 8'.

Figure 4:
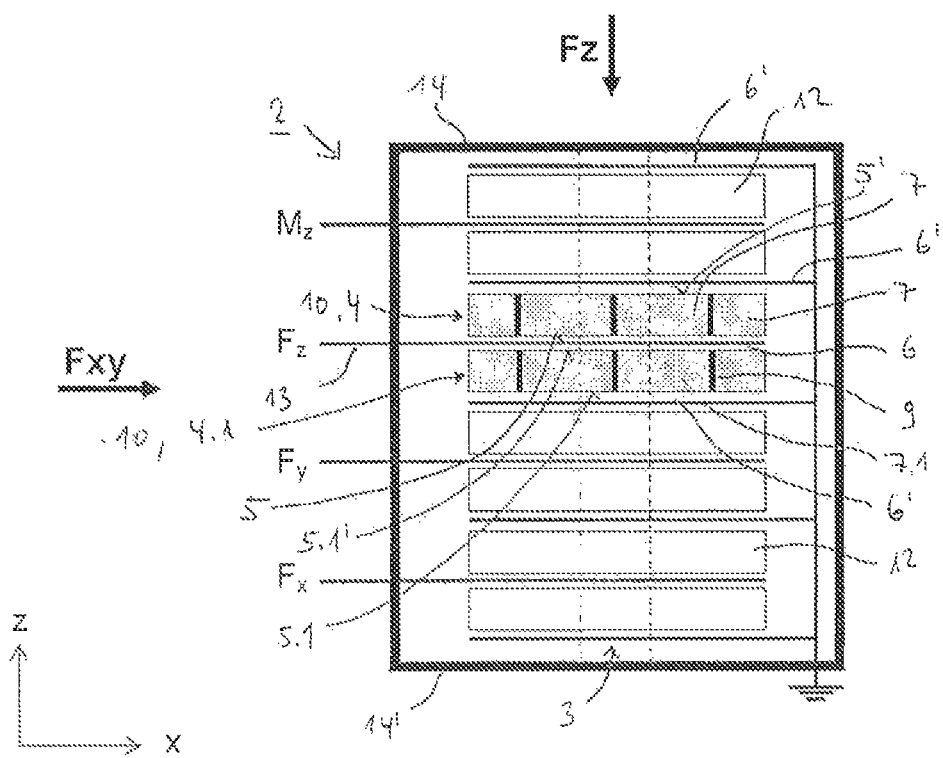
FIG. 4 shows a schematic view of an inventive measuring body.

It is proposed that an inventive measuring element 4 is installed into a measuring body 2 under prestress as illustrated in FIG. 4.

For this purpose, it is preferred to respectively use two inventive measuring elements 4, 4.1 that are arranged such that their force-receiving surfaces 5, 5.1' lie one on top of the other. Their polarizing directions are usually aligned opposite to one another for this purpose. The measuring elements 4, 4.1 therefore feature a common electrode 6 that is arranged between the measuring elements and electrically connected to a measuring signal line 13. This measuring signal line forwards the signal of the force component Fz to an amplifier, a converter and/or an evaluation device.

The measuring body 2 may particularly comprise additional measuring elements 12 that can measure other force components and/or moment components. Measuring element pairs for determining the forces Fx in the x-direction and Fy in the y-direction, as well as a measuring element pair Mz for determining the moment in the Z-direction, are particularly provided in FIG. 4. The measuring body 2 is realized under prestress although this cannot be gathered from the figure for reasons of clarity. All measuring elements 4, 4.1, 12 are realized in the form of disks or perforated disks 10 and have the same outside diameter and, if applicable, the same inside diameter. Due to the prestress in the z-direction, they firmly rest against the adjacent electrodes 6, 6' with their surfaces 5.1, 5.1', 5, 5'. These circumstances once again cannot be gathered from FIG. 4 for reasons of clarity. In this measuring body 2, all electrodes 6' are electrically connected to one another, as well as to the ground.

In this context, it should be noted that only the measuring elements 4, 4.1 provided for measuring the force component in the z-direction are divided into segments 7, but not the other measuring elements 12 for measuring the forces Fx, Fy or the moment Mz. The crosstalk of the measuring signals for the other components is not so intense that the thusly created errors would have to be corrected.

Figure 5:
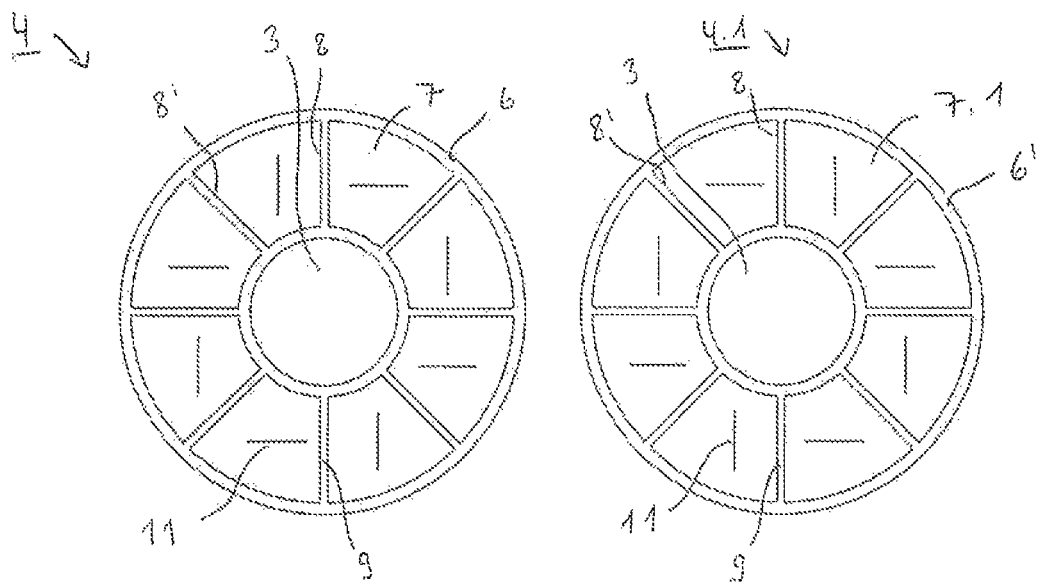
FIG. 5 shows a schematic view of an adjacently arranged inventive measuring element pair.

In the arrangement of two measuring elements 4, 4.1 in a tower, it can be ensured, according to the invention, that two segments 7, 7.1 lying opposite of one another at the electrode 6 are respectively aligned orthogonally to one another referred to their crystal structure 11 as illustrated in FIG. 5. The two measuring elements 4, 4.1 are identical and merely turned relative to one another by 90°. It was determined that the measuring error caused by crosstalk is minimal in this case because the individual errors thusly cancel out one another in the most efficient fashion.

Figure 6:
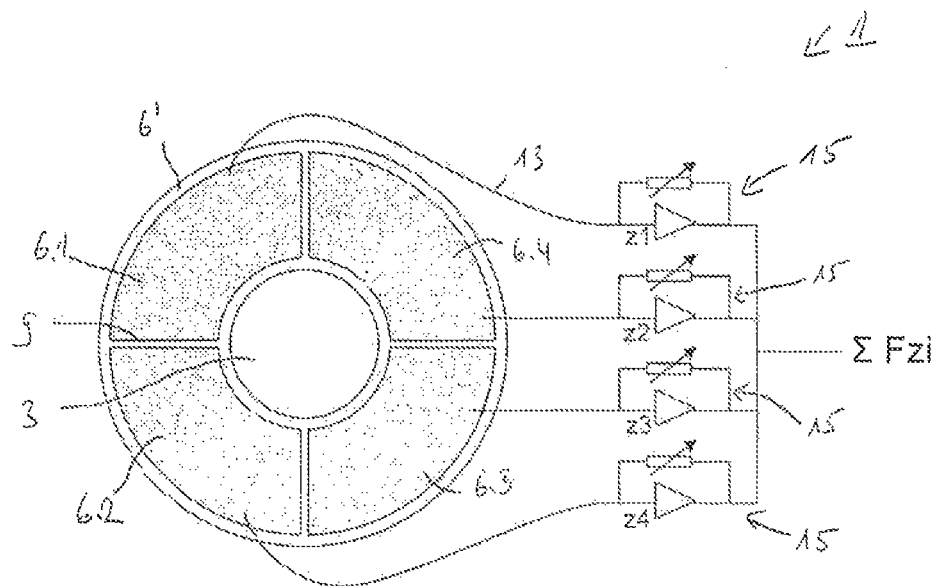
FIG. 6 shows a schematic view of an inventive measuring arrangement.

According to the invention, a measuring electrode 6 may also consist of several partial electrodes 6a, 6b, 6c and 6d that are electrically insulated from one another as illustrated in FIG. 6. These partial electrodes respectively only cover exactly one force-receiving surface 5.1 (not visible) of a measuring element segment 7.1 (not visible), wherein all partial electrodes 6a, 6b, 6c, 6d are connected to additional processing devices in an electrically insulated fashion. These signals particularly are individually amplified into respective forces Fzi in measuring signal amplifiers 15, wherein i stands for 1, 2, 3 and 4, and only combined after these amplifications in order to ultimately obtain the signal Fz.

LIST OF REFERENCE SYMBOLS

1 Measuring arrangement
2 Measuring body
3 Central circular opening
4, 4.1 Measuring element, disk
5'; 5.1; 5.1' Force-receiving surface of measuring element
6; 6.1; 6.2; 6.3; 6.4 Electrode
7.1 Segment of measuring element
8' Flank of segment
9 Gap, intermediate space
10 Disk or perforated disk
11 Crystal orientation
12 Other measuring elements for measuring forces Fx, Fy or a moment Mz
13 Line, measuring line
14 14' Force-applying surface of measuring body
15 Measuring signal amplifier
x Coordinate transverse to direction of force application Fz
y Coordinate transverse to direction of force application Fz
z Coordinate parallel to direction of force application Fz
X Crystallographic X-axis of piezoelectric crystal
Fxy Force F in x-y plane causing an interference force
Fz Force F in direction z to be measured

The invention claimed is:

1. A measuring element made of a piezoelectric crystal of symmetry class 32, and which is realized flat in a plane x-y and intended for installation into a measuring body for measuring a force Fz that acts perpendicularly upon the plane x-y and causes a charge accumulation on the surfaces of the measuring element that receive the force Fz and are provided with electrodes, and wherein transverse forces Fxy that act orthogonally to the force Fz and generate an error signal at the measuring element are expected upon the measuring body during a measurement, the measuring element comprising:

at least four identical measuring element segments, each segment including a crystal with straight flanks, wherein the segments are in the x-y plane adjacently arranged close to one another and spaced apart by narrow gaps at the flanks, and wherein said segments jointly form the shape of a disk or perforated disk in order to reduce the interference signals caused by transverse forces Fxy acting upon the measuring element, and in that the crystal orientations are aligned in the same direction or orthogonally to one another in the x-y plane of all segments.

2. The measuring element according to claim 1, wherein the segments cover at least 80% of the surface of the disk or perforated disk.

3. The measuring element according to claim 1, wherein the identical measuring element segments have the same material properties, shapes, dimensions and sensitivities.

4. The measuring element according to claim 1, wherein the polarizing directions of all adjacently positioned measuring element segments are oriented in the same direction.

5. The measuring element according to claim 1, wherein the crystal orientations of adjacent segments are aligned orthogonally to one another in alternating directions in the x-y plane.

6. The measuring element according to claim 1, wherein all measuring element segments are electrically connected to one another in parallel in order to add up the partial signals of all measuring element segments.

7. The measuring element according to claim 1, wherein the two electrodes continuously cover at least the surface of the disk or perforated disk to both sides of the segments.

8. The measuring element according to claim 1, wherein at least one of the electrodes of the measuring element includes several partial electrodes that are electrically insulated from one another and respectively cover only exactly one force-receiving surface of a measuring element segment, wherein all partial electrodes are connected to devices for additionally processing and subsequently adding up the partial force signals to Fz in an electrically insulated fashion.

9. A measuring body comprising:

two measuring elements, each measuring element made of a piezoelectric crystal of symmetry class 32, and which is realized flat in a plane x-y and intended for installation into a measuring body for measuring a force Fz that acts perpendicularly upon the plane x-y and causes a charge accumulation on the surfaces of the measuring element that receive the force and are provided with electrodes, and wherein transverse forces Fxy that act orthogonally to the force Fz and generate an error signal at the measuring element are expected upon the measuring body during a measurement, wherein the measuring element includes:

at least four identical measuring element segments, each segment including a crystal with straight flanks, wherein the segments are in the x-y plane adjacently arranged close to one another and spaced apart by narrow gaps at the flanks, and wherein said segments jointly form the shape of a disk or perforated disk in order to reduce the interference signals caused by transverse forces Fxy acting upon the measuring element, and in that the crystal orientations are aligned in the same direction or orthogonally to one another in the x-y plane of all segments, wherein the two measuring elements are arranged such that their respective force-receiving surfaces lie one above the other and include a common electrode arranged in between.

10. The measuring body according to claim 9, wherein the crystal orientations of adjacent segments of different measuring elements are aligned orthogonally to one another.

11. The measuring body according to claim 9, comprising at least one additional measuring element for measuring forces Fx and/or Fy and/or a moment Mz.

12. The measuring body according to claim 11, wherein each additional measuring element for Fx, Fy or Mz consists of a one-piece disk or a perforated disk.

13. The measuring body (2) according to claim 9, wherein the force-applying surfaces of the measuring body are aligned parallel to the pressure-receiving or force-receiving surfaces of the measuring elements.

14. The use of a measuring body claim 9 in a milling or planing tool, in order to determine the forces occurring orthogonally to the processing direction.

15. A measuring arrangement comprising:

a measuring body including two measuring elements, each measuring element made of a piezoelectric crystal of symmetry class 32 and which is realized flat in a plane x-y and intended for installation into the measuring body for measuring a force Fz that acts perpendicularly upon the plane x-y and causes a charge accumulation on the surfaces of the measuring element that receive the force and are provided with electrodes, and wherein transverse forces Fxy that act orthogonally to the force Fz and generate an error signal at the measuring element are expected upon the measuring body during a measurement, wherein each measuring element includes:

at least four identical measuring element segments, each segment including a crystal with straight flanks, wherein the segments are in the x-y plane adjacently arranged close to one another and spaced apart by narrow gaps at the flanks, and wherein said segments jointly form the shape of a disk or perforated disk in order to reduce the interference signals caused by transverse forces Fxy acting upon the measuring element, and in that the crystal orientations are aligned in the same direction or orthogonally to one another in the x-y plane of all segments, wherein each measuring element segment includes an electrically insulated partial electrode and the partial electrodes are electrically connected to one another in parallel in order to add up the partial signals of all measuring element segments, wherein the two measuring elements are arranged such that their force-receiving surfaces lie one above the other and feature a common electrode arranged in between and wherein the measuring arrangement including several measuring signal amplifiers, wherein each electrically insulated partial electrode is connected to a separate measuring signal amplifier in order to convert the measuring signals.

16. The measuring arrangement according to claim 15, wherein the outputs of all measuring signal amplifiers are electrically connected to one another in such a way that the output signals are added up.

* * * * *